United States Patent [19]

Lora et al.

[11] Patent Number: 5,196,460
[45] Date of Patent: Mar. 23, 1993

[54] RUBBER COMPOSITIONS CONTAINING HIGH PURITY LIGNIN DERIVATIVES

[75] Inventors: Jairo H. Lora, Media; Michael J. Trojan, West Chester, both of Pa.; William H. Klingensmith, Akron, Ohio

[73] Assignee: Repap Technologies Inc., Valley Forge, Pa.

[21] Appl. No.: 530,179

[22] Filed: May 29, 1990

[51] Int. Cl.[5] ............ C08J 3/00; C08K 5/13; C08L 97/00
[52] U.S. Cl. ..................... 524/76; 524/72; 524/75; 530/507
[58] Field of Search ............ 524/72, 76, 75; 530/507

[56] References Cited

U.S. PATENT DOCUMENTS 4,287,104  9/1981  Dimitri .................. 260/17.5
4,764,596  8/1988  Lora et al. .............. 530/507

OTHER PUBLICATIONS

Lora, et al., "Characteristics and Potential Applications of lignin Produced by an Organosolv Pulping Process", (1988), pp. 312-323.
Fries, "Development of Resins for the Rubber Industry", (1984), pp.1-23.
DePaoli, et al., "Sugar Cane Bagasse–lignin as Photo-Stabilizer for Butadiene Rubber".

*Primary Examiner*—John Kight, III
*Assistant Examiner*—D. Truong
*Attorney, Agent, or Firm*—Reed Smith Shaw & McClay

[57] ABSTRACT

A tackifier composition for use in rubber compounds is disclosed. The tackifier comprises a pure lignin with a water solubility of up to 1% by weight and a carbohydrate level of less than 50% by weight. In another embodiment of the invention, the pure lignin functions as both a tackifier and an antioxidant. In yet another preferred embodiment of the invention, the improved tackifier produces synergistic results when blended with a commercial tackifier, and the antioxidant likewise yields synergistic results when mixed with a commercial antioxidant.

41 Claims, 3 Drawing Sheets

RUBBER COMPOSITIONS CONTAINING HIGH PURITY LIGNIN DERIVATIVES

FIELD OF THE INVENTION

This invention relates to a composition that when added to rubber enhances the tackifier properties and alternatively the tackifier and antioxidant properties of the resulting rubber product. More specifically, this invention relates to a tackifying and antioxidant composition for rubber comprising a highly pure lignin derivative.

BACKGROUND OF THE INVENTION

Many forms of rubber, particularly synthetic rubber, such as styrene-butadiene (SBR) exhibit relatively low polarity compared with other rubbers. Unlike natural rubber for example, SBR does not develop surface peroxidal activity upon mastication, and as a result demonstrates poor inherent and/or processed tack.

A composition possesses "tack" if, under the condition of application, only light pressure produces a bond of sufficient strength between separate pieces of the material such that restoring the bond interface to its original separated state requires performing work on the bond. Tack is essential in the production of rubber, which requires strong tackifying action and good tack for processability. Additionally, the production of plyed rubber tire components such as tires, belts, hoses and other rubber parts comprising multiple layers of rubber depends upon rubber having good tack properties.

Adding tackifiers such as resins or natural rubber to compositions with poor tack properties, such as SBR, increases the tack of the resulting rubber compositions, and thereby increases the tendency of the composition to adhere to itself. However, adding natural rubber to impart tack properties to synthetic rubber defeats the very purpose of synthetic rubbers, designed to replace expensive natural rubber. Accordingly, the rubber industry has for the most part relied upon phenolic resins, such as modified alkylphenols of the type illustrated in FIG. 3 to impart tack to rubber compositions. Although these resins are effective in producing the desired tack, they are still relatively expensive and suffer from obvious environmental drawbacks. Hydrocarbon resins, such as tall oil-based resins, have also been used with limited success.

As a result of the disadvantages of the prior art tackifiers, the rubber industry has for years sought less costly, more environmentally acceptable substitutes for phenolic tackifier resins, with very limited success. For example, a tall-oil pitch and Kraft lignin coprecipitate has been developed for use as a rubber tackifier. See U.S. Pat. No. 4,287,104. The use of Kraft lignin in this application has not flourished commercially, however, in view of the need for expensive purification or derivatization of the Kraft lignin and the requirement of cumbersome Kraft lignin tall oil pitch coprecipitation procedures which are generally impractical to carry out in a rubber production facility.

The rubber industry therefore maintains a continuing need for an inexpensive, effective and environmentally agreeable alternative to presently available rubber tackifiers.

The pulp and paper industry produces tremendous quantities of Kraft lignin and lignosulfonate which, for the most part, are either burnt as fuel in high pressure boilers or discharged as waste with a consequent negative environmental impact. Although wood chemists have for many years addressed the problem of locating useful non-fuel applications for these wood lignins, currently less than 2% of all lignin available from spent pulping liquors are recovered and marketed for non-fuel uses in the United States. Accordingly, there exists a long-standing and ongoing need to implement new, non-fuel ways of effectively using lignin and other biomass by-products.

The use of materials of vegetable origin in rubber compounds has been reported in the past. These references generally refer to the proposed use of Kraft lignins as reinforcing agents, extenders, fillers and substitutes for carbon black. See, e.g., U.S. Pat. Nos. 3,312,643; 3,296,158; 3,282,871; 3,163,614; 3,991,022; 2,610,954; 3,364,158; 2,802,815; 3,984,362; and 3,817,974. See also Fries, "Development of Resins for the Rubber Industries" (1984), referring to the use of lignin only in reinforcing and dispergator applications. The Fries reference specifically mentions that products based on lignin have failed to gain importance in the rubber industry. This is due once again to the expensive purification/derivatization procedures required for Kraft lignin, discussed above.

SUMMARY OF THE INVENTION

In accordance with the invention, lignin recovered from biomass can be used in effective amounts as a tackifier for rubber compositions. The lignin can be selected from a number of lignins including the group consisting of Kraft, organosolv, steam explosion and autohydrolysis lignins.

The lignin tackifiers of the present invention are effective in various types of rubber compositions, including synthetic rubbers, natural rubbers and/or combinations thereof. When used in effective amounts, the tackifier lignins of the invention have been found to equal and even exceed in performance parameters more expensive and commercially available tackifier compounds. Although the effective amount of lignin tackifiers can vary from about 1 to about 50 phr depending upon the type of rubber and lignin used, a preferred embodiment of the invention uses lignin tackifiers in amounts less than or equal to about 5 phr, and more preferably less than or equal to about 3 phr lignin.

In another aspect of the invention, the lignin tackifier is blended with a commercial tackifier, yielding synergistic tackifying results when used in a rubber composition in effective amounts. Again, while effective amounts of this tackifier blend can vary depending upon the type of lignin, the commercial resin used and the rubber composition, by way of example, a preferred embodiment uses about 1.5 phr organosolv lignin tackifier and about 1.5 phr phenol resin tackifier in an SBR rubber composition.

Yet in another aspect of the invention lignin is used as a combined tackifier and antioxidant. Although the effective amount of lignin used as a combined tackifier and antioxidant may vary depending on the type of lignin and rubber composition, in general, the antioxidant properties increase with increased amounts of lignin. In a preferred embodiment, about 5 phr or less of lignin are used in an SBR rubber composition to impart both tackifier and antioxidant properties to the composition.

In yet another aspect of the invention, the lignin used as a combined tackifier and antioxidant is blended with a commercial antioxidant which yields synegistic results. While the effective amount of lignin used as a combined tackifier and antioxidant can vary with the type of lignin, the rubber composition and the commercial antioxidant used, by way of example a preferred embodiment blends about 5 phr of organosolv lignin with about 3 phr of a hydroquinoline resin in a tire carcass rubber composition.

These and other details of the invention shall become more readily apparent as the following detailed description of the preferred embodiments of practicing the invention proceeds.

DETAILED DESCRIPTION OF THE PREFERRED EMBODIMENT

Figure 2:
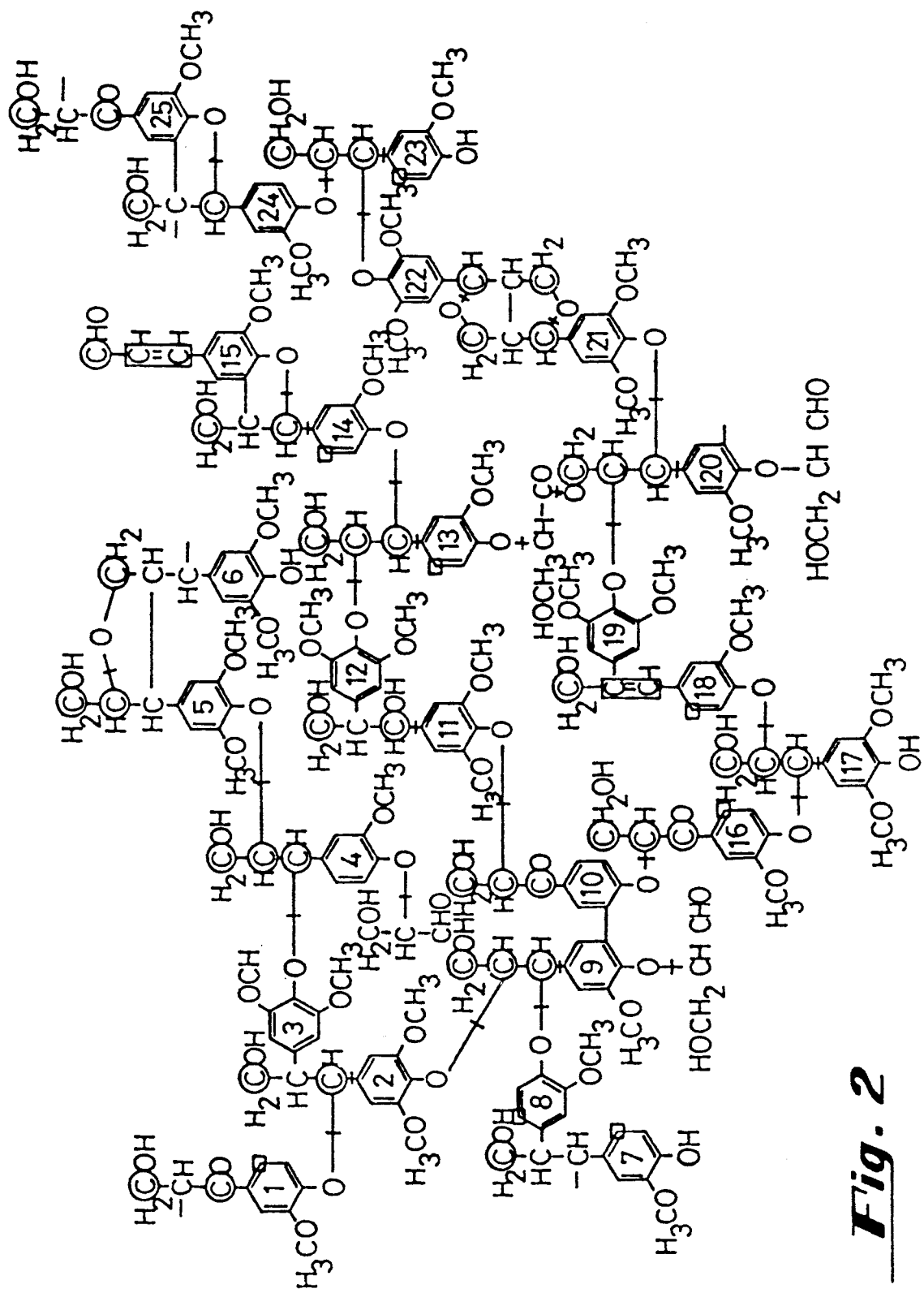
FIG. 2 is an illustration of the chemical structure of native lignin as it exists in wood, prior to pulping.

FIG. 2 illustrates the chemical structure of native lignin as it exists in wood, prior to pulping operations. The absence of a sulfonated structure and the presence of an aromatic ring with available hydroxyl groups make lignin a well-suited candidate for producing a highly reactive phenolic structure for use in tackifier and antioxidant applications for rubber compounds.

Generally, conventional pulping processes do not recover a lignin as illustrated in FIG. 2. These processes are primarily designed to recover pulp as the end product, and lignin as a combustible or disposable by-product. As a result, commercially available lignins generally have high levels of carbohydrates (e.g. wood sugars), ash, sodium and sulfur, which appear to severely restrict practical uses of such lignins including their uses as a rubber tackifier and antioxidant.

Nonetheless, we believe that virtually any lignin prepared from biomass by any suitable process can be used in effective amounts as a tackifier and alternatively as a combined tackifier and antioxidant. While the mechanism by which the various lignins perform their tackifier and antioxidant functions is not clearly understood, the degree of tackifier property is believed to be linked to the existence of dipoles which make the ligin compatible with the rubber being tackified. In general, these tackifier properties improve as the purity of the lignin increases, for example, as the amount of carbohydrate present in the lignin is lowered, and alternatively when the water solubility of the lignin approaches zero. An example of a high purity lignin is an organosolv lignin such as ALCELL ® lignin, produced according to the organosolv pulping process, discussed herein. However, we believe it would be possible to impart the particular lignin being used with the requisite dipole effect even in the case of lignins failing to possess the lignin purity parameters discussed above. These lignins include those produced via the Kraft, sulfite, organosolv, steam explosion, soda and autohydrolysis-extraction processes as well as any other process that might be used for producing lignin from biomass, such as wood, sugar cane bagasse, bamboo, coconut shell, etc., as such processes are known in the art.

More specifically, we believe that lignins (other than lignosulfonate) having low water solubility, e.g., less than 1% in water at 25° C. and pH of 7 or less, and having low carbohydrate levels less than 50% by weight, preferably less than 25% by weight, more preferably less than 5% by weight and most preferably less than 2% by weight are useful as tackifiers. It is believed that carbohydrates, such as wood sugars, may either interfere with the dipole effects of the lignin tackifier or the compatibility of the lignin with the rubber in which it is used, as sugars tend to be hydrophillic, while rubbers tend to be hydrophobic. Therefore, hydrophobic lignins outperform as tackifiers those lignins tending to be hydrophillic, again, possibly due to the hydrophobic nature of synthetic rubbers in which they may be incorporated as tackifier and antioxidant.

The effective amount of lignin used may vary from lignin to lignin, rubber to rubber and degree of tack and antioxidant properties required of the end product. Generally, the effective amount of tackifier used is from about 1 to 50 phr, preferably from about 1 to 5 phr and most preferably from about 1.5 to 3.0 phr tackifier. It may be possible to decrease the effective amount of lignin used to about 0.5 phr or less, especially where the lignin is used in conjunction with another tackifier such as a phenolic resin.

The mechanism whereby tackifiers are believed to work involves the existence of dipoles between the tackifier and the rubber, and may also be the result of hydrogen bonding effects. Rubber tends to be non-polar and hydrophobic, whereas tackifiers are partially polar, partially non-polar. The non-polar portion of the tackifier is compatible with the rubber and therefore tends to be soluble in the rubber, whereas the polar portion of the tackifier tends to protrude from the surface of the rubber, making it able to attract other polar portions of tackifier protruding from other rubber surfaces and thereby provide tackifier properties to the composition. For this reason, we believe that those lignins which are soluble in a particular type of rubber and which exhibit high dipole and hydrogen bonding effects are well suited as rubber tackifiers.

As used herein, the term "lignin" means any lignin as shown in FIG. 2, as well as any lignin derivatives as they exist following pulping and lignin extraction. As used herein, the term "rubber" shall mean all natural and synthetic rubbers and blends thereof. As used herein, the term "phr" means parts per one-hundred parts rubber.

Recent developments in the pulp and paper industry have resulted in the availability of relatively pure forms of lignin which have been found to perform well as tackifiers. For example, Kraft lignins, such as INDULIN, manufactured by Westvaco, New York, N.Y., and organosolv lignin, such as ALCELL ®, produced by ALCELL ® Developments Inc. of New Castle, New Brunswick, Canada, which contain very low levels of carbohydrates can be used. Additionally, organosolv lignin such as ALCELL ® lignin is very low in ash and inorganic contaminants such as sodium and sulfur and is therefore well-suited to perform as a tackifier.

ALCELL ® lignin is prepared according to the process described in U.S. Pat. No. 4,764,596, incorporated by reference herein. The ALCELL ® process is an alcohol-based pulping technology which is highly effective in delignifying biomass, such as hardwood and sugar cane bagasse to produce a bleachable pulp equivalent to hardwood pulps produced by conventional processes. This approach to wood pulping has several advantages over traditional technology, including lower capital cost and reduced environmental impact.

Figure 1:
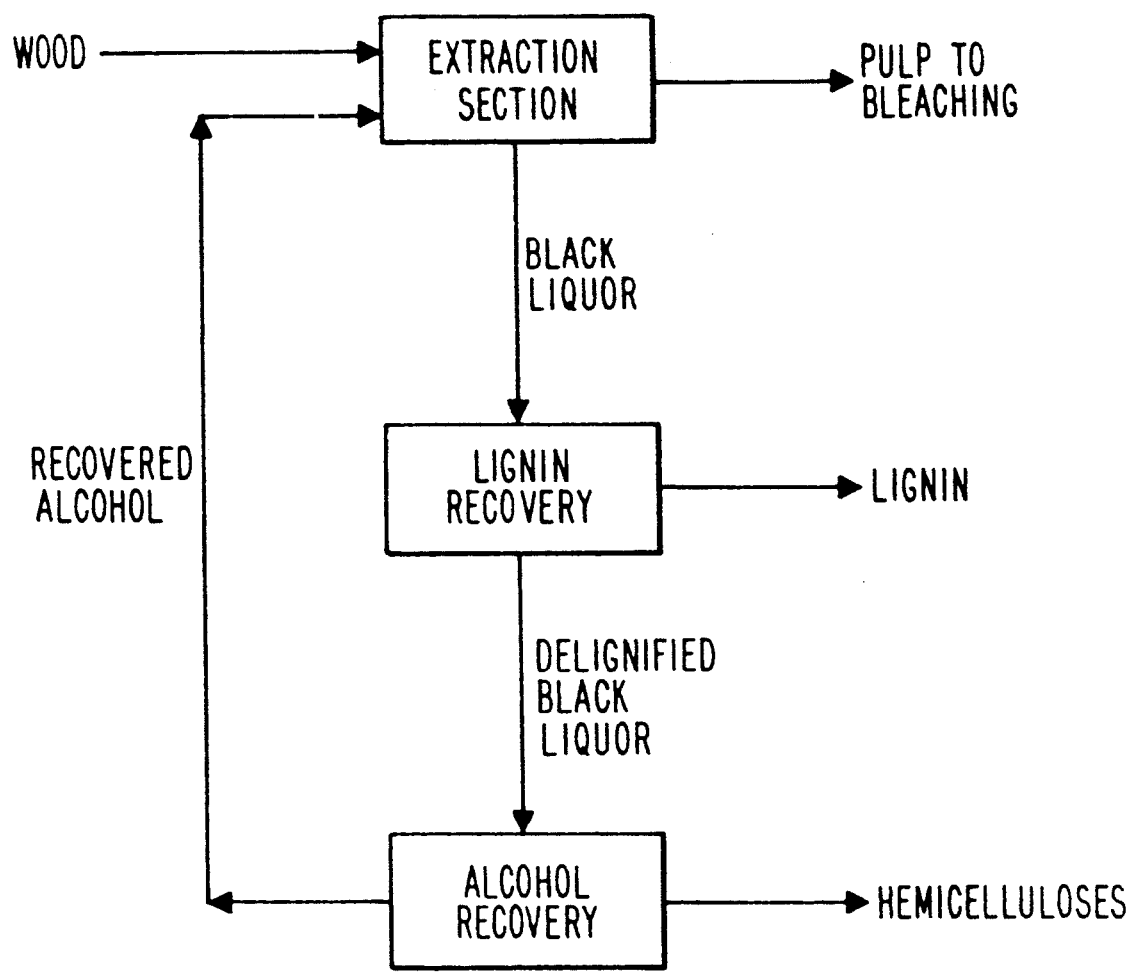
FIG. 1 is a schematic representation of an organosolv pulping process, resulting in high purity organosolv lignin.

FIG. 1 is a schematic illustration of the ALCELL ® process. The ALCELL ® process extracts lignin from biomass such as wood using an alcohol-water based cooking liquor at about 195° C. to generate a bleachable pulp and a black liquor from which the ALCELL ® lignin is recovered by precipitation, liquid-solid separation and drying. The delignified black liquor is fed to a distillation tower and the alcohol recovered in this way is recycled to the extraction area. A more detailed description of the process of producing ALCEll ® lignin is disclosed in U.S. Pat. No. 4,764,596.

Following precipitation of the ALCELL ® lignin according to U.S. Pat. No. 4,764,596, the lignin may be prepared for addition to rubber as a tackifier and alternatively as tackifier and antioxidant, preferably by separation using conventional liquid/solid separation equipment, such as a drum filter followed by water washing and drying, using drying procedures well known to those skilled in the art.

Typical properties of the recovered ALCELL ® lignin are summarized in Table 1. ALCELL ® lignin has a $C^9$ formula of $C_9H_{8.53}O_{2.45}(OCH_3)_{1.04}$, is produced as a dry powder with a moisture of less than 3% and a bulk density of about 0.57 g/mL. The material is soluble in polar organic solvents such as alcohols and acetone, and also in dilute aqueous alkali solutions. It is insoluble (less than 1% soluble) in water under neutral or acidic conditions at 25° C., and can be made progressively water soluble under increasing alkaline conditions (pH greater than 7).

The ALCELL ® lignin has a relatively low molecular weight (number average below 1,000). Differential Scanning Calorimetry studies show that this lignin has one glass transition temperature in the 90°–100° C. range, and that upon further heating, the material softens between 130 and 150@C. In high temperature decomposition runs in an oxygen atmosphere the ALCELL ® material shows a single exothermic peak at more than 450° C. As described in U.S. Pat. No. 4,764,596, ALCELL ® lignin can be characterized as having: a relatively low number average molecular weight of about 800 to 1500 g/mol, preferably about 900 to 1300 g/mol and a glass transition temperature which is preferably about 100° to 170° C., particularly about 130° to 150° C., although a glass transition temperature of preferably about 80° to 170° C., particularly about 90° to 150° C. is also observed; a narrow molecular weight distribution, i.e., a polydispersity of less than about 4, preferably no more than about 3, particularly only about 1.5 to 2.7; and a methoxyl content approximately equal to th methoxyl content of native lignin (i.e., about 20% for hardwoods and about 14% for softwoods). This lignin also has a softening temperature which is preferably about 120° too 150° C., particularly about 130° C. to 150° C. ALCELL ® lignin has a medium particle size of around 30 microns. If required, the particle size can be modified by pelletization.

Figure 3:
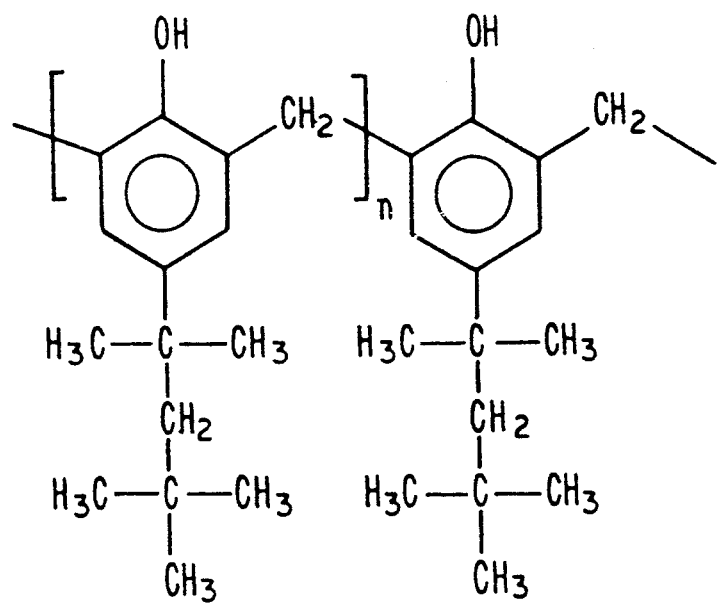
FIG. 3 is an illustration of a commercially available phenolic tackifier resin, para-tertiary-octylphenol (PTOP) resin.

FIG. 2 is an illustration of the structure of native lignin as it exists in wood and shows the presence of reactive sites on native lignin. Because of the unique process of, recovery lignin is recovered in a pure form and closely resembles the structure shown in FIG. 2. Furthermore, the number of phenolic hydroxyl groups present in ALCELL ® lignin result in a greater reactivity. FIG. 3 shows by way of comparison the structure of an octylphenol resin which is used commercially as a tackifier in plyed rubber compounds.

According to the present invention, organosolv lignin such as ALCELL ® lignin has been found to perform unexpectedly well as a substitute for commercial phenolic tackifiers. In a preferred embodiment of the invention, ALCELL ® lignin generally having properties as set forth in Table 1 is incorporated into a rubber composition at a low level of about 1.5 phr in order to impart tack to the rubber. ALCELL ® lignin is surprisingly effective at such a low level in view of the prior art references teaching effectiveness ranges of from about 3 to about 5 phr. See Fries, "Development of Resins For the Rubber Industry" at 11.

Unexpectedly, the use of Kraft lignin such as INDULIN and organosolv lignin such as ALCELL ® lignin outperforms commercially available tackifiers. Furthermore, ALCELL ® lignin exhibits synergistic properties when used in conjunction with certain commercial tackifiers.

EXAMPLE I

Washed, air-dried poplar ALCELL ® lignin was incorporated into a styrene-butadiene rubber (SBR #1503), manufactured by Ameripol Synpol Company of Port Neches, Tex. SBR 1503 was selected because of its low inherent tack. Frequently, SBR 1503 must be compounded with tack enhancement materials. Furthermore, SBR 1503 is stabilized with a fatty-acid type polymer and has no rosin stabilizers which could mask the effect of ALCELL ® lignin additions.

Six formulations were prepared for this study as shown in Table II. The amount of tackifier added was varied and ALCELL ® lignin was compared to a commercially available octylphenol formaldehyde tackifying resin, such as DYPHENE ® #8318, manufactured by PMC Specialties Group, Inc., of Rocky River, Ohio. Two levels of tackifier using four test formulations were used for purposes of comparison and to determine functional equivalence. The fifth formulation combined equal amounts of ALCELL ® lignin and a commercial octylphenol tackifying resin. The sixth formulation did not contain a tackifier resin and was used as a blank formulation. Table II shows the recipes used for this study. Table XXII sets forth the ingredients used in the herein examples.

Standard mixing procedures were employed to formulate the formulations shown in Table II. The SBR 1503 rubber was mixed for about 0.5 minute (Banbury mixing at 77 rpm rotor speed, a ram pressure of 70 psi) with the zinc oxide, tackifier and half of the carbon black. Stearic acid, a plasticizer such as CIRCOSOL ® 4240 and the remaining carbon black were added and mixed for one-and-one-half minutes, followed by a three-minute sweep down and three-and-one-half minute dump. This was followed by mill mixing at 23 rpm front roll and about 32 rpm back roll (Band Masterbatch), wherein the sulfur and an accelerator such as SANTOCURE ® powder were added and mixed for about 0.5 minute. The pan was swept and added to the batch about 1.5 minutes. Three cross cuts (each side) and six end passes were performed in two minutes; grain set, in four minutes; and sheet off in four-and-one-half minutes.

The compositions were cured in a compression set curing apparatus at a ram pressure of 2,000 psi and cure temperature of 320° F. in a 6"×6"×0.75" mold cavity for 16 and 24 minutes, respectively.

All compounds were tested for tack using the hand tack rating method. In this method samples are plyed together using approximately 2.0 pounds hand pressure. A person skilled in the art of milling, mixing and handling of rubber compounds ranked the relative tack performance of the samples using a rating system from poor to excellent where "poor" exhibits no tack or very good release; "fair" exhibits good release; "good" exhibits good release which must be started by hand; "very good" exhibits poor release which must be pulled apart by hand; and "excellent," which means no separation occurs and the samples cannot be pulled apart by hand. Samples were rated at 24-hour intervals after aging at about 73° F. Each compound was also tested for rheometer, original physical properties, compression set and staining characteristics.

Table III shows the rheometer results for the six formulations shown in Table II. All resin additions increased cure time by up to 90%.

Table IV shows comparative tack results for the Table II formulations. At low levels of tackifier additions of about 1.5 phr ALCELL® lignin (D) better tack is obtained when using a commercial resin at a similar level (B). At higher levels of resin additions of about 3 phr ALCELL® lignin (E) does not perform quite as well as the commercial material although the perfomance is acceptable in comparison with the commercial resin used at the same level (C). When the commercial resin and ALCELL® lignin are combined in equal parts such as in (F) the best tack was obtained which suggests synergy between ALCELL® lignin and the commercial resin.

Table V shows the results of tests of unaged physical properties for the Table II formulations. In this study ALCELL® lignin (D & E) improved the performance of the formulations when compared with formulations using a commercial resin (B & C). As shown in Table V, tensile properties are nearly equivalent in all cases, while the performance in modulus and durometer is generally improved in the ALCELL® lignin-containing formulations. The modulus results suggest that ALCELL® lignin may have positive effects on green strength, which is known to decrease with the addition of commercial phenolic tackifying resins. As further illustrated in Table V, compression set increased with the addition of ALCELL® lignin while it decreased with the addition of commercial resin. Both the commercial and ALCELL® lignin formulations were non-staining.

EXAMPLE II

Tables VI through XI set forth data from a second set of tests using ALCELL® lignin in a tire carcass compound having recipe formulations as shown in Table VI. These formulations were prepared using standard rubbermaking procedures such as described previously.

In this experiment, the performance of ALCELL® lignin was compared to a commercially available octylphenol tackifying resin for tack characteristics and to a hydroquinoline resin for antioxidant properties. Building tack is a critical property for carcass compounds and these compounds are one of the largest area of applications for tackifying resins.

Comparative hand tack performance data (Tables VIII and IX) demonstrates that at about 5 phr of ALCELL® tackifier, the ALCELL® lignin, though not performing quite as well as a commercial tackifier, nonetheless produced acceptable tackifier results.

For the first part of this experiment three formulations were prepared. A formulation containing no tackifying resin was used as a blank. A second formulation containing a commercial tackifying resin was used. The third formulation containing ALCELL® lignin was also used. All formulations contained a hydroquinoline antioxidant. In the second part of the test a formulation containing neither an antioxidant nor a tackifier was used.

All formulations were tested by the hand tack method as previously described after aging for 0, 24, 48, 120, and 168 hours at about 73° F. Tack was also tested after exposure to about 95% relative humidity at about 100° F. Bashore rebound and green strength properties were tested. Rheometer data and unaged physical properties were also obtained. Accelerated aging was performed according to ASTM D573 (168 hrs. @212° F., 24 hr recovery) and ASTM D572 (168 hrs.@158° F. under 300 psi oxygen pressure, 24 hour recovery).

Table VII shows the rheometer results for the tested formulations. Cure times when compared to the blank were increased when a commercial resin and ALCELL® lignin were added to the formulation.

Table VIII shows the results of the hand tack test. As with the styrene-butadiene rubber SBR 1503 compound, ALCELL® lignin acts as a tackifying resin.

Table IX shows the results of tack tests after exposure to about 95% relative humidity at 100° F. The tack ratings for the ALCELL® lignin containing formulations demonstrated tackifier properties.

Table X shows the results of unaged physical property tests. Tensile properties in the formulations using phenolic tackifiers were lower as compared to the blank control. Durometer values for the ALCELL® lignin containing test formulations were comparable to the blank formulation whereas the commercial resin lowered durometer values. Modulus values for the ALCELL® lignin containing test formulations were again higher than the commercial resin containing formulations as was the case in the SBR 1503 study. These results again show improved strength for the ALCELL® lignin containing test formulations over the green strength of commercial resin containing test formulation.

Table XI shows the results of green strength, compression set and Bashore rebound tests performed on the tire carcass test formulations of Table VI. Although the test formulations with tackifier additions exhibited deteriorated green strength as compared to the blank test formulations, the loss of strength using ALCELL® lignin was significantly lower than when a commercial resin was used as compared test formulations containing no tackifying resin. The Bashore rebound results show that the ALCELL® lignin containing test formulations had improved performance as compared to commercial resin containing test formulations.

EXAMPLE III

Another aspect of the invention entails the use of pure lignin other than ALCELL® lignin as a tackifier. For purposes of this disclosure, "pure lignin" is a lignin derived from biomass with a carbohydrate content of less than about 50% by weight. Unexpectedly pure Kraft lignin, produced by purifying lignin derived from the Kraft pulping process, can perform as a tackifier without the addition of any tall oil pitch or other additives to coagulate with the lignin added in order to disperse the lignin. See U.S. Pat. No. 4,287,104. This is unexpected in view of the fact that Kraft lignin, unalike ALCELL ® lignin, has no softening (ring and ball) point or glass transition temperature, generally believed to be necessary for the lignin to perform as a tackifier. Furthermore, lignosulfonate can also function as a tackifier, though not as well as ALCELL ® and Kraft lignins possibly because the lignosulfonate used was not a pure lignin, as were the ALCELL ® and Kraft lignins.

Table XII illustrates tire carcass formulations used for additional tests in order to compare the tackifier properties of two commercial tackifier resins for example PMC DYPHENE ® 8318 and Schenectady Chemical SP-1068) with ALCELL ® lignin (ADI/L899 and ADI/L900), lignosulfonate (ADI/L897) and Kraft lignin (ADI/L898). The Kraft lignin used in this study was INDULIN, manufactured by Westvaco Corporation, New York, N.Y. The lignosulfonate used was NOR-LIG, manufactured by Daishowa, Quebec, Canada and no attempt was made to purify the lignosulfonate for this study. The two ALCELL ® formulations were taken from a single ALCELL ® lignin sample which was divided in order to evaluate the degree of testing consistency. The ALCELL ® lignins used in the formulations shown in Table XII comprised lignins derived from mixed species feedstocks. All samples in Table XII were prepared using standard rubbermaking procedures similar to those discussed previously.

As best illustrated in Tables XIII through XIX, the Kraft lignin tackifier test formulation demonstrated the best overall performance in terms of unaged tensile strength decrease, unaged modulus, (See Table XIII) Bashore rebound, (See Table XV) Goodrich flexometer (heat build-up) (See Table XVIII) and green strength (See Table XIX).

Hand tack results as shown in Tables XVI and XVII demonstrate the very good performance of ALCELL ® lignin containing test formulations (B and C). These tables also demonstrate that pure Kraft lignin containing test formulation (E) and lignosulfonate containing test formulation (D) in addition to ALCELL ® lignin perform as well as a tackifier, although, the lignosulfonate does not perform as well. This is likely due to the fact that the lignosulfonate used for this experiment was not purified, suggesting that improved results could be obtained if the lignosulfonate was purified into a pure lignin derivative.

EXAMPLE IV

Figure 4:
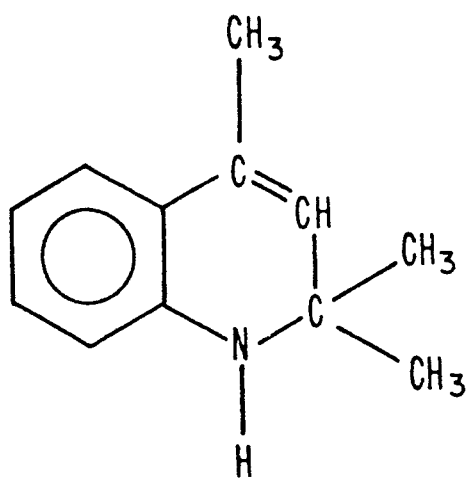
FIG. 4 is an illustration of a commercially available hydroquinoline antioxidant used in conjunction with a preferred embodiment of the invention.

Tables XX and XXI show the results of accelerated heat and oxygen aging, respectively, and illustrate the effects of ALCELL ® lignin as an antioxidant in the tire carcass formulations set forth in Table VI. These results demonstrate that ALCELL ® lignin has both tackifier and antioxidant properties that can result in synergistic improvements when the ALCELL ® lignin is used in combination with a commercial antioxident, in this case, a hydroquinoline resin such as illustrated in FIG. 4.

Generally, antioxidants used in rubber act as oxygen scavengers, preferentially diverting oxygen-generated free radicals away from unsaturated highly reactive sites in the polymer backbone of the rubber, thereby preventing, or at least delaying, oxygen attack and subsequent decomposition of the rubber. The mechanism whereby these oxygen scavengers are believed to work is by offering sacrificial sites to react with the oxygen-generated free radicals, which make the rubber vulnerable to oxygen attack. The use of lignin as antioxidant is especially significant in view of the large number of —OH groups which are present in lignin and particularly organosolv lignin such as ALCELL ® lignin. These —OH groups are believed to act as scavengers for the oxygen-generated free radicals.

Formulations containing ALCELL ® lignin and the commercial resins exhibited no migratory staining.

The data show that ALCELL ® lignin can tackify rubber compounds with performance characteristics similar to commercially available octylphenol tackifying resins. In addition, ALCELL ® lignin can improve the antioxidant properties of commercially available octylphenol tackifying resins. When ALCELL ® lignin is used in conjunction with a commercial tackifying resin in a styrene-butadiene rubber, tack properties are enhanced as compared to using either ALCELL ® lignin or the commercial tackifier alone. Likewise, when ALCELL ® lignin is used in conjunction with a commercial antioxidant the oxygen resistance of the tested compound as measured by accelerated heat and oxygen bomb aging is enhanced over using either ALCELL ® lignin or the commercial antioxidant resin alone. Green strength and Bashore rebound are improved using ALCELL ® lignin as compared to using a commercial octylphenol tackifying resin.

While the invention has been described and illustrated herein by reference to various specific materials, procedures and examples, it is understood that the invention is not restricted to the particular combinations of materials and procedures selected for that purpose. Numerous variations of such details can be employed, as will be appreciated by those skilled in the art. For example, in addition to being useful in applications involving styrene-butadiene rubber compounds, those skilled in the art would also appreciate the applicability of the invention to other rubbers, such as, without limitation, nitrile rubbers, natural rubber blends, such as natural styrene-butadiene rubber, styrene-butadiene resin, poly-styrene resin, butyl rubber, halo-butyl rubber, neoprene rubber, polysulfide rubber, polyvinyl chloride resin, polyvinyl acetate resin, acrylic resin and polyvinylidiene chloride resin. Also, the invention can be practiced in conjunction with other types of tackifier resins, for example, petrochemical resins such as hydrocarbon resins known to those skilled in the art. In such an application for example, ALCELL ® lignin can be blended with the hydrocarbon resin. Furthermore, it is intended that the invention can also find applicability in non-rubber fields, such as adhesives, caulks, sealants and foundry core binders.

TABLE I

| TYPICAL PROPERTIES OF ALCELL ® LIGNIN | |
|---|---|
| Carbon, % | 60-66 |
| Hydrogen, % | 5-7 |
| Methoxyl, % | 15-19 |
| Ash, % | less than 1 |
| Moisture, % | less than 3 |
| Wood Sugars, % | less than 0.5 |
| Acid Number | 20-25 |
| Specific Gravity | 1.27 |
| Softening, ring and ball, °C. | 145 |

TABLE I-continued
TYPICAL PROPERTIES OF ALCELL ® LIGNIN

| | |
|---|---|
| Heating Value, J/kg | $4.6 \times 10^7$ |
| Heating Value, Btu/lb | 11,000 |
| Glass Transition Temperature, °C. | 90–150 |
| Number Average Molecular Weight g/mol | 800–1500 |
| Weight Average Molecular Weight g/mol | less than 2,000 |
| Median Particle Size, microns | 20–40 |

TABLE II
SBR 1503 F/A TEST RECIPE

| | COMPOUND | | | | | |
|---|---|---|---|---|---|---|
| TACKIFIER | A BLANK | B COMMERCIAL RESIN 1.5 phr | C COMMERCIAL RESIN 3.0 phr | D ALCELL ® LIGNIN 1.5 phr | E ALCELL ® LIGNIN 3.0 phr | F ALCELL ® LIGNIN 1.5 phr + COMMERCIAL RESIN 1.5 phr |
| SBR 1503 | 100.00 | 100.00 | 100.00 | 100.00 | 100.00 | 100.00 |
| FEF N550 CARBON BLACK | 50.00 | 50.00 | 50.00 | 50.00 | 50.00 | 50.00 |
| CIRCOSOL 4240 | 5.00 | 5.00 | 5.00 | 5.00 | 5.00 | 5.00 |
| ZINC OXIDE | 3.00 | 3.00 | 3.00 | 3.00 | 3.00 | 3.00 |
| RUBBER MAKER'S SULFUR | 2.00 | 2.00 | 2.00 | 2.00 | 2.00 | 2.00 |
| STEARIC ACID | 1.00 | 1.00 | 1.00 | 1.00 | 1.00 | 1.00 |
| SANTOCURE POWDER | 1.25 | 1.25 | 1.25 | 1.25 | 1.25 | 1.25 |
| COMMERCIAL RESIN (PMC DY-PHENE #8318) | — | 1.50 | 3.00 | — | — | 1.50 |
| ALCELL ® LIGNIN | — | — | — | 1.50 | 3.00 | 1.50 |

TABLE III
RHEOMETER RESULTS, ASTM D2084, SBR 1503 COMPOUND

| COMPOUND | TACKIFIER | TORQUE, MAX NT-M (LB-IN) | TORQUE, MIN NT-M (LB-IN) | SCORCH TIME Ts-2 MIN | CURE TIME Tc 90% MIN |
|---|---|---|---|---|---|
| A | BLANK | 10.50 (92.94) | 1.37 (12.08) | 4.96 | 15.04 |
| B | COMMERCIAL RESIN 1.5 phr | 10.00 (88.52) | 1.37 (12.15) | 4.04 | 15.29 |
| C | COMMERCIAL RESIN 3.0 phr | 9.53 (84.37) | 1.36 (12.01) | 3.75 | 15.92 |
| D | ALCELL ® LIGNIN 1.5 phr | 10.35 (91.62) | 1.47 (12.98) | 5.33 | 15.62 |
| E | ALCELL ® LIGNIN 3.0 phr | 9.89 (87.55) | 1.40 (12.43) | 5.83 | 16.12 |
| F | ALCELL ® LIGNIN 1.5 phr COMMERCIAL RESIN 1.5 phr | 9.75 (86.31) | 1.41 (12.50) | 4.83 | 16.08 |

TABLE IV
TACK RESULTS, SBR 1503 F/A COMPOUND

| COMPOUND | TACKIFIER | 0 HR | 24 HR | 48 HR | 72 HR | 96 HR | 120 HR | 144 HR | 160 HR |
|---|---|---|---|---|---|---|---|---|---|
| A | BLANK | POOR | POOR | POOR | POOR | POOR | POOR | POOR | POOR |
| B | COMMERCIAL RESIN 1.5 phr | FAIR | FAIR | FAIR | FAIR | FAIR | FAIR | FAIR | FAIR |
| C | COMMERCIAL RESIN 3.0 phr | VERY GOOD | VERY GOOD | VERY GOOD | VERY GOOD | GOOD | FAIR | FAIR | FAIR |
| D | ALCELL ® LIGNIN 1.5 phr | GOOD | GOOD | GOOD | FAIR | FAIR | POOR | POOR | POOR |
| E | ALCELL ® LIGNIN 3.0 phr | GOOD | GOOD | GOOD | GOOD | GOOD | FAIR | FAIR | FAIR |
| F | ALCELL ® LIGNIN 1.5 phr COMMERCIAL RESIN 1.5 phr | VERY GOOD | VERY GOOD | VERY GOOD | VERY GOOD | VERY GOOD | GOOD | GOOG | GOOD |

TABLE V

RESULTS OF PHYSICAL PROPERTY TESTS, SBR 1503 COMPOUND

| | COMPOUND | | | | | | |
|---|---|---|---|---|---|---|---|
| | A | B | C | D | E | F | |
| TACKIFIER | BLANK | COMMERCIAL RESIN 1.5 phr | COMMERCIAL RESIN 3.0 phr | ALCELL® LIGNIN 1.5 phr | ALCELL® LIGNIN 3.0 phr | ALCELL® LIGNIN 1.5 phr + | COMMERCIAL RESIN 1.5 phr |
| ULT % | 340 | 340 | 380 | 360 | 370 | 370 | |
| 100% MODULUS, MPa (PSI) | 4.20 (610) | 4 (580) | 3.86 (660) | 4.55 (580) | 4 (610) | 4.20 | |
| TENSILE, MPa (PSI) | 21.24 (3080) | 20.62 (2990) | 20.55 (2980) | 21.03 (3050) | 19.31 (2800) | 20.28 (2940) | |
| SHORE A DUROMETER, PTS | 70 | 69 | 69 | 70 | 70 | 68 | |
| COMPRESSION SET, D395 22 HRS @ 158° F., 25% DEFLECTION, ½ HR RECOV | 14.6 | 13.8 | 13.2 | 15.7 | 16.8 | 17.1 | |
| STAINING, ASTM D925 | NONE | NONE | NONE | NONE | NONE | NONE | |

TABLE VI

TIRE CARCASS TEST RECIPE

| | BLANK (NO ANTIOXIDANT) (NO TACKIFIER) | BLANK (NO TACKIFIER) | COMMERCIAL RESIN | ALCELL® LIGNIN |
|---|---|---|---|---|
| RSS #1 (NATURAL RUBBER) | 35.00 | 35.00 | 35.00 | 35.00 |
| TAKTENE 220 | 65.00 | 65.00 | 65.00 | 65.00 |
| N650 CARBON BLACK | 35.00 | 35.00 | 35.00 | 35.00 |
| SUNDEX 790 | 2.00 | 2.00 | 2.00 | 2.00 |
| ANTIOXIDANT | — | 3.00 | 3.00 | 3.0 |
| ZINC OXIDE | 5.00 | 5.00 | 5.00 | 5.00 |
| SUNOLITE 666 | 3.00 | 3.00 | 3.00 | 3.00 |
| STEARIC ACID | 1.00 | 1.00 | 1.00 | 1.00 |
| COMMERCIAL TACKIFIER | — | — | 5.00 | — |
| ALCELL® LIGNIN | — | — | — | 5.00 |
| SANTOCURE NS | .50 | .50 | .50 | .50 |
| R.M. SULFUR | 1.90 | 1.90 | 1.90 | 1.90 |
| SANTOGARD PVI | .20 | .20 | .20 | .20 |

TABLE VII

RHEOMETER RESULTS, ASTM D2084, TIRE CARCASS COMPOUND

| COMPOUND | TORQUE, MAX. NT-M (LB-IN) | TORQUE, MIN. NT-M (LB-IN) | SCORCH TIME Ts-2 MIN | CURE TIME Tc 90% MIN |
|---|---|---|---|---|
| BLANK (NO TACKIFIERS) | 6.13 (54.22) | 1.77 (15.63) | 7.46 | 13.37 |
| COMMERCIAL RESIN 5 phr | 4.49 (39.73) | 1.49 (13.22) | 7.21 | 15.00 |
| ALCELL® LIGNIN 5 phr | 5.15 (45.55) | 1.87 (16.51) | 8.08 | 15.37 |

TABLE VIII

TACK RESULTS, TIRE CARCASS COMPOUND, AGED AT 73° F.

| TACKIFIER | 0 HRS | 24 HRS | 72 HRS | 120 HRS | 168 HRS |
|---|---|---|---|---|---|
| BLANK (NO TACKIFIERS) | GOOD | FAIR | POOR | POOR | POOR |
| COMMERCIAL RESIN 5 phr | EXCELL | EXCELL | EXCELL | V. GOOD | GOOD |
| ALCELL® LIGNIN 5 phr | V. GOOD | GOOD | FAIR | FAIR | FAIR |

TABLE IX

TACK RESULTS, TIRE CARCASS COMPOUND, AGED AT 95% R.H., 100° F.

| TACKIFIER | 24 HRS | 72 HRS | 96 HRS | 120 HRS | 168 HRS |
|---|---|---|---|---|---|
| BLANK (NO TACKIFIER) | FAIR | POOR | POOR | POOR | POOR |
| COMMERCIAL RESIN 5 phr | V. GOOD | GOOD | GOOD | FAIR | FAIR |

TABLE IX-continued

| TACK RESULTS, TIRE CARCASS COMPOUND, AGED AT 95% R.H., 100° F. | | | | | |
|---|---|---|---|---|---|
| TACKIFIER | 24 HRS | 72 HRS | 96 HRS | 120 HRS | 168 HRS |
| ALCELL ® LIGNIN 5 phr | GOOD | FAIR | FAIR | POOR | POOR |

TABLE X

UNAGED PHYSICAL PROPERTY RESULTS, ASTM D412 AND D2240 TIRE CARCASS COMPOUND

| PROPERTY | NO TACKIFIER | COMMERCIAL TACKIFIER, 5 phr | ALCELL ® LIGNIN, 5 phr |
|---|---|---|---|
| ULT % ELONGATION | 600 | 650 | 610 |
| 300% MODULUS, MPa (PSI) | 5.79 (840) | 3.85 (560) | 4.89 (710) |
| TENSILE, MPa (PSI) | 16.34 (2370) | 13.17 (1910) | 12.48 (1810) |
| SHORE A DUROMETER, PTS | 50 | 45 | 50 |

TABLE XI

GREEN STRENGTH, TIRE CARCASS COMPOUND, ASTM D412 COMPRESSION SET, % ASTM D395 METHOD B, BUTTONS AGED 22 HOURS @ 158° F., 25% DEFLECTION BASHORE REBOUND, %, ASTM D2632

| TACKIFIER | GREEN STRENGTH MPa (PSI) | COMP SET % | REBOUND % |
|---|---|---|---|
| BLANK (NO TACKIFIER) | 1.43 (207) | 26.2 | 53.0 |
| COMMERCIAL TACKIFIER 5 phr | 0.88 (127) | 34.9 | 48.0 |
| ALCELL ® LIGNIN 5 phr | 1.09 (158) | 33.1 | 50.7 |

TABLE XII

FORMULATIONS

| | Blank A | ALCELL ® B | ALCELL ® C | Ligno Sulf. D | Kraft E | Commercial 8318 F | Commercial 1068 G |
|---|---|---|---|---|---|---|---|
| RSS #1 | 35.00 | 35.00 | 35.00 | 35.00 | 35.00 | 35.00 | 35.00 |
| Taktene 220 | 65.00 | 65.00 | 65.00 | 65.00 | 65.00 | 65.00 | 65.00 |
| N650 Carbon Black | 35.00 | 35.00 | 35.00 | 35.00 | 35.00 | 35.00 | 35.00 |
| Sundex 790 | 2.00 | 2.00 | 2.00 | 2.00 | 2.00 | 2.00 | 2.00 |
| Flectol H | 3.00 | 3.00 | 3.00 | 3.00 | 3.00 | 3.00 | 3.00 |
| Zinc Oxide | 5.00 | 5.00 | 5.00 | 5.00 | 5.00 | 5.00 | 5.00 |
| Sunolite 666 | 3.00 | 3.00 | 3.00 | 3.00 | 3.00 | 3.00 | 3.00 |
| Stearic Acid | 1.00 | 1.00 | 1.00 | 1.00 | 1.00 | 1.00 | 1.00 |
| ADI/L899 (ALCELL ®) | — | 5.00 | — | — | — | — | — |
| ADI/L900 (ALCELL ®) | — | — | 5.00 | — | — | — | — |
| ADI/L897 (Lignosulfonate) | — | — | — | 5.00 | — | — | — |
| ADI/L898 (Kraft Lignin) | — | — | — | — | 5.00 | — | — |
| PMC Dyphene 8318 (Commercial Resin) | — | — | — | — | — | 5.00 | — |
| SP 1068 (Commercial Resin) | — | — | — | — | — | — | 5.00 |
| Santocure NS | 0.50 | 0.50 | 0.50 | 0.50 | 0.50 | 0.50 | 0.50 |
| Rubber Maker's Sulfur | 1.90 | 1.90 | 1.90 | 1.90 | 1.90 | 1.90 | 1.90 |
| Santogard PVI | 0.20 | 0.20 | 0.20 | 0.20 | 0.20 | 0.20 | 0.20 |
| TOTAL | 151.60 | 156.60 | 156.60 | 156.60 | 156.60 | 156.60 | 156.60 |

TABLE XIII

UNAGED PHYSICAL PROPERTIES, ASTM D412 & ASTM D2240: ASTM DIE C DUMBBELLS TESTED @ 20"/MINUTE CROSSHEAD SPEED

| | COMPOUND | | | | | | |
|---|---|---|---|---|---|---|---|
| Tackifier | A Blank | B ALCELL ® | C ALCELL ® | D Ligno Sulfonate | E Kraft | F Commercial 8318 | G Commercial 1068 |
| Ultimate Elongation, % | 600 | 580 | 610 | 630 | 590 | 660 | 650 |
| 100% Modulus, psi | 180 | 160 | 170 | 110 | 210 | 140 | 140 |
| 200% Modulus, psi | 460 | 330 | 410 | 240 | 480 | 360 | 310 |
| 300% Modulus, psi | 840 | 680 | 710 | 460 | 870 | 640 | 560 |
| Tensile Strength, psi | 2370 | 1700 | 1810 | 1360 | 2270 | 2040 | 1910 |
| Durometer, points, Shore A | 50 | 50 | 50 | 45 | 51 | 46 | 45 |

TABLE XIV

COMPRESSION SET, ASTM D395 METHOD B: ASTM BUTTONS AGED 22 HOURS @ 158° F., 25% DEFLECTION

| Compound | A | B | C | D | E | F | G |
|---|---|---|---|---|---|---|---|
| Compression Set, % | 26.2 | 34.8 | 33.1 | 46.3 | 24.2 | 30.7 | 34.9 |

TABLE XV

BASHORE REBOUND, ASTM D2632:

| Compound | A | B | C | D | E | F | G |
|---|---|---|---|---|---|---|---|
| Rebound, % | 53.0 | 50.7 | 50.7 | 48.7 | 52.3 | 49.0 | 48.0 |

TABLE XVI

HAND TACK RATINGS
SPECIMENS AGED AND TESTED @ 73° F.

| Compound | A | B | C | D | E | F | G |
|---|---|---|---|---|---|---|---|
| Immediate | Good | Very Good | Very Good | Good | Very Good | Excellent | Excellent |
| 24 hours | Fair | Good | Good | Good | Good | Excellent | Excellent |
| 72 hours | Poor | Fair | Fair | Fair | Good | Very Good | Excellent |
| 120 hours | Poor | Fair | Fair | Fair | Fair | Very Good | Very Good |
| 168 hours | Poor | Fair | Poor | Poor | Fair | Good | Very Good |

TABLE XVII

HUMIDITY HAND TACK RATINGS
SPECIMENS AGED AND TESTED @ 95% R.H., 100° F.

| Compound | A | B | C | D | E | F | G |
|---|---|---|---|---|---|---|---|
| 24 hours | Fair | Good | Good | Good | Good | Very Good | Very Good |
| 72 hours | Poor | Good | Fair | Good | Good | Very Good | Good |
| 96 hours | Poor | Fair | Fair | Fair | Fair | Good | Good |
| 120 hours | Poor | Poor | Poor | Fair | Fair | Good | Fair |
| 168 hours | Poor | Poor | Poor | Poor | Poor | Good | Fair |

TABLE XVIII

GOODRICH FLEXOMETER, HEAT BUILD UP,
ASTM D623 METHOD A:

| Compound | A | B | C | D | E | F | G |
|---|---|---|---|---|---|---|---|
| Starting, Temperature °F. | 122 | 122 | 122 | 122 | 122 | 122 | 122 |
| Dynamic Deflection, % | 17.4 | 34.2 | 32.1 | 53.8 | 17.4 | 26.2 | 28.0 |
| Static Deflection, % | 26.3 | 27.8 | 29.0 | 34.5 | 25.5 | 31.2 | 30.4 |
| Temperature Rise, Minutes | 13.0 | 25 | 25 | 15.5 | 13.0 | 13.5 | 16.0 |
| Temperature Rise, °F. | 36.5 | 74.5 | 72.5 | 142.0 | 42.0 | 49.5 | 53.0 |

TABLE XIX

GREEN STRENGTH, ASTM D412:
ASTM DIE C DUMBBELLS TESTED @
20"/MINUTE CROSSHEAD SPEED

| Compound | A | B | C | D | E | F | G |
|---|---|---|---|---|---|---|---|
| Green Strength, psi | 207 | 165 | 158 | 169 | 176 | 136 | 127 |

TABLE XX

ACCELERATED HEAT AGING, ASTM D573,
168 HRS @ 212° F., 24 HR RECOVERY

| | NO ANTIOXIDANT | COMMERCIAL ANTIOXIDANT, 3 phr | COMMERCIAL ANTIOXIDANT, 3 phr ALCELL ® LIGNIN, 5 phr |
|---|---|---|---|
| ULT ELONGATION % CHANGE | −85.96 | −60.00 | −49.68 |
| TENSILE STRENGTH % CHANGE | −79.33 | −50.20 | −24.10 |

TABLE XXI

ACCELERATED OXYGEN AGING, ASTM D572,
168 HRS @ 300 PSI OXYGEN, 158° F., 24 HR RECOVERY

| PROPERTY | NO ANTIOXIDANT | COMMERCIAL ANTIOXIDANT, 3 phr | COMMERCIAL ANTIOXIDANT, 3 phr ALCELL ® LIGNIN, 5 phr |
|---|---|---|---|
| ULT ELONGATION % CHANGE | −28.07 | −21.67 | −15.41 |
| TENSILE STRENGTH % CHANGE | −50.65 | −29.96 | −11.09 |

TABLE XXII

| Ingredient | Supplier |
|---|---|
| RSS #1 | Goodyear Tire & Rubber Co. Akron, OH |
| TAKTENE 220 | Polysar/Nova Sarina, Ontario, Canada |
| N650 Carbon Black | Columbian Chemical Company Atlanta, GA |
| SUNDEX 790 | Sun Refining & Marketing Philadelphia, PA |
| FLECTOL H | Monsanto St. Louis, MO |
| Zinc Oxide | Zochem Brampton, Ontario, Canada |
| SUNOLITE 666 | Witco Akron, OH |
| Stearic Acid | H. M. Royal, Inc. Trenton, NJ |
| SANTOCURE NS | Monsanto St. Louis, MO |
| Rubber Maker's Sulfur | R. E. Carroll Trenton, NJ |
| SANTOGARD PVI | Monsanto St. Louis, MO |
| SBR 1503 | Ameripol Synpol Port Neches, TX |
| N550 Carbon Black | Cabot Corporation Atlanta, GA |
| CIRCOSOL 4240 | Sun Refining & Marketing Philadelphia, PA |
| SANTOCURE Powder | Monsanto St. Louis, MO |
| AGERITE Resin D | R. T. Vanderbilt Norwalk, CT |

We claim:

1. A tackifier composition for rubber comprising a lignin recovered from biomass wherein said lignin has a water solubility of up to 1% by weight at a pH of 7 or less and a carbohydrate level of less than 50% by weight.

2. The tackifier composition of claim 1 wherein said lignin is further blended with a second tackifier resin.

3. The tackifier composition of claim 2 wherein said lignin and said second tackifier resin are blended in equal parts by weight.

4. The tackifier composition of claim 3 wherein said second tackifier resin is selected from the group consisting of phenol tackifying resins and hydrocarbon tackifying resins.

5. The tackifier composition of claim 4 wherein said lignin is selected from the group consisting of kraft, organosolv, steam explosion, soda and autohydrolysis-extraction lignin.

6. The tackifier composition of claim 1 wherein said lignin is used in an effective amount to impart antioxidant properties to a rubber composition.

7. The tackifier composition of claim 6 wherein said effective amount of said lignin is about 5 phr.

8. The tackifier composition of claim 7 which further comprises a second antioxidant blended with said lignin.

9. The tackifier composition of claim 8 which comprises about 5 phr of said lignin and about 3 phr of said second antioxidant.

10. The tackifier composition of claim 9, which further comprises a second tackifier resin selected from the group consisting of phenol tackifier resins and hydrocarbon tackifier resins.

11. The tackifier composition of claim 10, wherein said lignin is an organosolv lignin.

12. A rubber composition comprising a raw rubber stock and a tackifier composition as in claim 1, said tackifier composition being sufficiently soluble in said rubber composition such that when present in said rubber composition in an effective amount said lignin imparts tackifying properties to said rubber composition.

13. The rubber composition of claim 12 wherein said raw rubber stock is selected from the group consisting of styrene-butadiene rubber, natural rubber-styrene-butadiene blend, nitrile rubber, styrene-butadiene resin, polystyrene resin, butyl rubber, halo-butyl rubber, neoprene rubber, polysulfide rubber, polyvinyl chloride resin, poly-vinyl acetate resin, acrylic resin and polyvinylidene chloride resin.

14. The rubber composition of claim 13 wherein said tackifier composition comprises of from about 0.5 to about 50 phr of said lignin.

15. The rubber composition of claim 14 wherein said effective amount of said tackifier composition comprises of from about 1 to about 5 phr of said lignin.

16. The rubber composition of claim 15 wherein said effective amount of said tackifier composition comprises of from about 1.5 to about 3 phr of said lignin.

17. The rubber composition of claim 13 wherein said lignin is further blended with a second tackifier resin.

18. The rubber composition of claim 17 wherein said lignin and said second tackifier resin are blended in equal parts by weight.

19. The rubber composition of claim 18 wherein said second tackifier resin is selected from the group consisting of phenol tackifying resins and hydrocarbon tackifying resins.

20. The rubber composition of claim 19 wherein said lignin in said tackifier composition is selected from the group consisting of kraft, organosolv, steam explosion, soda and autohydrolysis-extraction lignin.

21. The rubber composition of claim 13 wherein said lignin is used in an effective amount to impart antioxidant properties to said rubber composition.

22. The rubber composition of claim 21 wherein said effective amount of said lignin is about 5 phr.

23. The rubber composition of claim 22 which further comprises a second antioxidant blended with said lignin.

24. The rubber composition of claim 23 which comprises about 5 phr of said lignin and about 3 phr of said second antioxidant.

25. The rubber composition of claim 24 which further comprises a second tackifier resin selected from the group consisting of phenol tackifier resins and hydrocarbon tackifier resins.

26. The rubber composition of claim 25 wherein said lignin is an organosolv lignin.

27. A process for producing a rubber composition comprising mixing raw rubber stock and a lignin wherein said lignin has a water solubility of up to 1% by weight at a pH of 7 or less and a carbohydrate content of less than 50% by weight and wherein said lignin is sufficiently soluble in said rubber composition such that said lignin imparts tackifying properties to said rubber composition.

28. The process of claim 27 wherein said raw rubber stock is selected from the group consisting of styrene-butadiene rubber, natural rubber-styrene-butadiene blend, nitrile rubber, styrene-butadiene resin, polystyrene resin, butyl rubber, halo-butyl rubber, neoprene rubber, polysulfide rubber, polyvinyl chloride resin, poly-vinyl acetate resin, acrylic resin and polyvinylidene chloride resin.

29. The process of claim 28 wherein said lignin is from about 0.5 to about 50 phr.

30. The process of claim 29 wherein said lignin is from about 1 to about 5 phr.

31. The process of claim 30 wherein said lignin is from about 1.5 to about 3 phr.

32. The process of claim 28 wherein said lignin is further blended with a second tackifier resin.

33. The process of claim 32 wherein said lignin and said second tackifier resin are blended in equal parts by weight.

34. The process of claim 33 wherein said second tackifier resin is selected from the group consisting of phenol tackifying resins and hydrocarbon tackifying resins.

35. The process of claim 28 wherein said lignin is selected from the group consisting of kraft, organosolv, steam explosion, soda and autohydrolysis-extraction lignin.

36. The process of claim 28 wherein said lignin is used in an effective amount to impart antioxidant properties to said rubber composition.

37. The process of claim 36 wherein said effective amount of said lignin is about 5 phr.

38. The process of claim 37 which further comprises a second antioxidant blended with said lignin.

39. The process of claim 38 which comprises about 5 phr of said lignin and about 3 phr of said second oxidation.

40. The process of claim 39 which further comprises a second tackifier resin selected from the group consisting of phenol tackifier resins and hydrocarbon tackifier resins.

41. The process of claim 40 wherein said lignin is an organosolv lignin.

* * * * *

UNITED STATES PATENT AND TRADEMARK OFFICE
CERTIFICATE OF CORRECTION

PATENT NO.  : 5,196,460
DATED       : March 23, 1993
INVENTOR(S) : Lora, et. al.

It is certified that error appears in the above-indentified patent and that said Letters Patent is hereby corrected as shown below:

Column 5, line 17, delete "ALCE11" and insert --ALCELL--.

Column 12, Table IV, line 13, delete "GOOG" and insert -- GOOD--.

Signed and Sealed this

Twenty-sixth Day of April, 1994

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,196,460
DATED : March 23, 1993
INVENTOR(S) : Lora et al.

It is certified that error appears in the above-indentified patent and that said Letters Patent is hereby corrected as shown below:

Col. 3, line 54, delete "ligin" and insert --lignin--.

Col. 5, line 58, delete "th" and insert --the--.

Col. 5, line 61, delete "too" and insert --to--.

Col. 5, line 43, delete "@" and insert --°--.

Col. 9, line 19, after "resins" and before "for", insert --(--.

Cols. 17 and 18, move text on lines 1-6 to lines 21-26 and simultaneously move text on lines 7-25 to lines 1-19.

Signed and Sealed this

Eighteenth Day of October, 1994

Attest:

BRUCE LEHMAN

Attesting Officer

Commissioner of Patents and Trademarks